Nov. 15, 1938.  L. J. McKINNEY ET AL  2,136,452
SAFETY PULL-ROD CONNECT AND DISCONNECT MACHINE
Filed June 25, 1933   3 Sheets-Sheet 1

INVENTOR
Lawrence Jefferson McKinney
Christian Winther Jensen

Nov. 15, 1938.   L. J. McKINNEY ET AL   2,136,452
SAFETY PULL-ROD CONNECT AND DISCONNECT MACHINE
Filed June 25, 1935    3 Sheets-Sheet 2

INVENTOR
Lawrence Jefferson McKinney
Christian Winther Jensen

INVENTOR
Lawrence Jefferson McKinney
Christian Winther Jensen

Patented Nov. 15, 1938

2,136,452

UNITED STATES PATENT OFFICE 2,136,452

SAFETY PULL-ROD CONNECT AND DISCONNECT MACHINE

Lawrence Jefferson McKinney and Christian Winther Jensen, Detroit, Mich.

Application June 25, 1935, Serial No. 28,342

9 Claims. (Cl. 74—593)

This invention relates to a means for connecting and disconnecting a reciprocating power line adapted especially to furnishing power for pumps.

More particularly our invention relates to improvements in a machine primarily designed for use in the crude petroleum industry for the pumping of oil wells, whereby a reciprocating power line is joined at one portion by a latch and latch holder, which in turn cooperate with a safety lock, a release latch lever and a safety stop-rear adjustable guide.

One object of the invention is to provide a connect and disconnect mechanism which has foolproof safety features.

Another object of the invention is to provide means whereby it is impossible to lose control of the reciprocating power pull-rod line by improper operation of the machine.

Another object of the invention is to provide means for holding the line in the event of improper operation of the machine or breakage of the reciprocating power pull-rod line.

Another object of the invention is to provide means for proper adjustments, independent of each other, of the various divisions of the machine thereby insuring perfect alignment. This eliminates friction and loss of power in the machine, the forming of kinks in the reciprocating power pull-rod line, thrust and side motion strain in the machine and permits proper adjustment regardless of the surface elevation.

Another object of the invention is to provide means which makes for ease of installation and ease of removal of connect-disconnect device, from one location to another.

Another object of the invention is to provide means for restoring the power pull-rod line in case of breakage, to the power source.

Another object of the invention is to provide means allowing for the proper setting of the machine for the variation in the various revolving eccentrics of the different types of power dispensers in use.

We attain these objects by mechanism illustrated in the accompanying drawings, in which:—

Similar numerals refer to similar parts throughout the several views.

Figure 1:
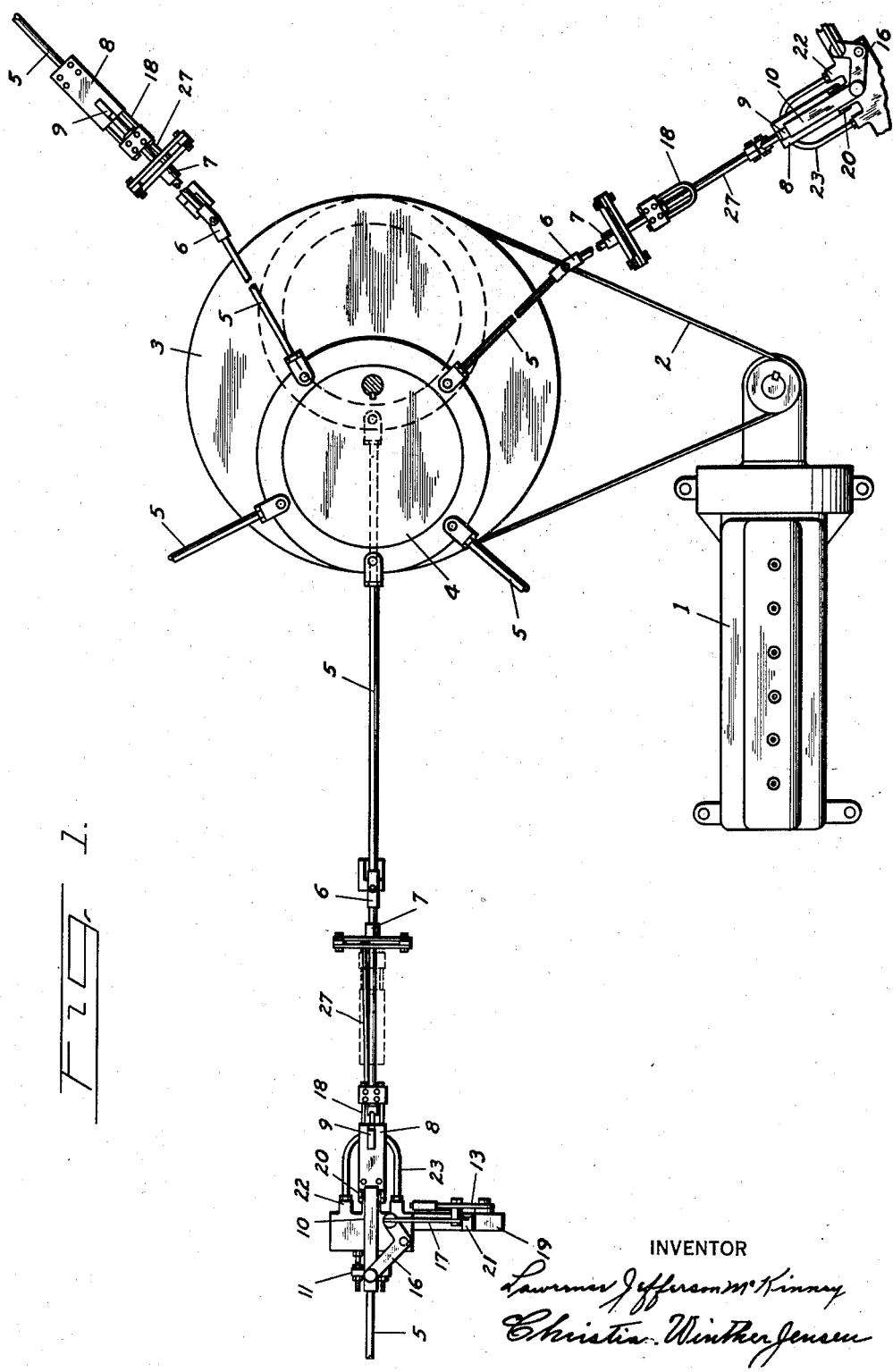
Figure 1 is a plan view of the power energy, the power dispenser, the power pull-rod lines and three different views of the safety pull-rod connect and disconnect machine.

Referring by reference characters to these various figures, in Figure 1 is shown the source of power energy 1 which transmits its power through drive 2 to the power dispenser 3 which in turn transfers power to the revolving eccentric 4, all of which are common practices. The power is transferred from the revolving eccentric 4 to the power pull-rod lines 5, also in common practice.

Figure 2:
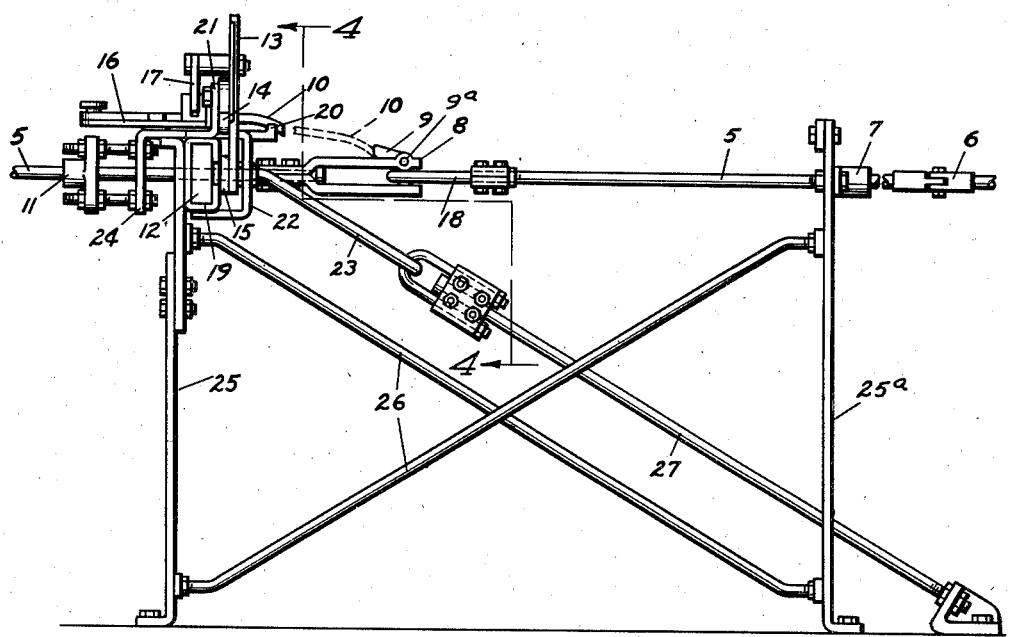
Figure 2 is a side view of the safety pull-rod connect and disconnect machine.

The power is carried by the power pull-rod line 5 to the pivoted joint 6, Figure 2, which removes from the power pull-rod line 5 all side motion or sway created by the revolving eccentric 4 thereby delivering the said power pull-rod line 5 in a straight line or nearly so into the front adjustable guide 7, Figure 2. This guide 7 is supported by legs or standards 25a which can be made adjustable as are legs or standards 25, Figure 2. Said front adjustable guide 7 is adjustable to continue the power pull-rod line 5 in straight alignment with latch holder 8, said power pull-rod line 5 and said latch holder 8 being supported by safety stop-rear adjustable guide 11 which in turn is supported by the adjustable, slotted legs or standards 25, Figure 2.

The latch holder 8 is slotted and contains a semi-automatic latch 9. The shear which might arise in pin 9a which passes through the boss of latch holder 8 and holds semi-automatic latch 9 in position in the said latch holder 8 is eliminated by the mechanical shape of said semi-automatic latch 9 so that when said semi-automatic latch 9 is engaged with hook 18, connected to the power pull-rod line 5, the latch holder 8 absorbs the strain equally on the top and bottom parts of same. This relieves any strain on the said pin 9a. The semi-automatic latch 9 is heavier on the lower half so it will remain closed, Figure 2, unless held out of this position by the release latch lever 10, Figure 6, which will be described later.

Referring to latch holder 8, Figure 2, the power pull-rod line 5 is connected to each end. At one end it is connected by the hook 18 and the semi-automatic latch 9. It is clamped in the other end of latch holder 8 and is continued on through the safety stop-rear adjustable guide 11 to the work device, as for example, an oil well pump, not shown. The safety stop-rear adjustable guide 11 is supported by the bracket 24 which in turn is supported by the slotted, adjustable legs or standards 25.

Figure 4:
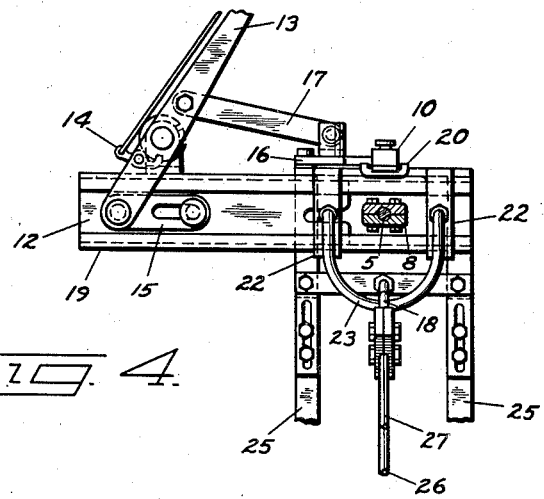
Figure 4 is a vertical section of a part of the safety pull-rod connect and disconnect machine on the line 4—4 of Figure 2.
Figure 6:
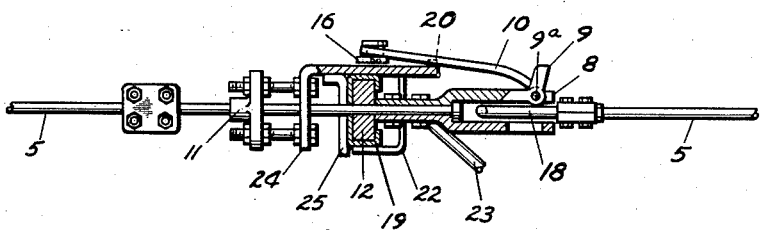
Figure 6 is a side view of part of the safety pull-rod connect and disconnect machine on line 6—6 of Figure 5.

The safety lock 12, Figure 4, and the release latch lever 10, Figure 6, are both supported by the frame 19 and operated manually by the manual control lever 13, Figure 4, which is provided with a manual control lever lock 14, Figure 4. The manual control lever 13 is mounted on frame 19 by a bracket 21.

Figure 3:
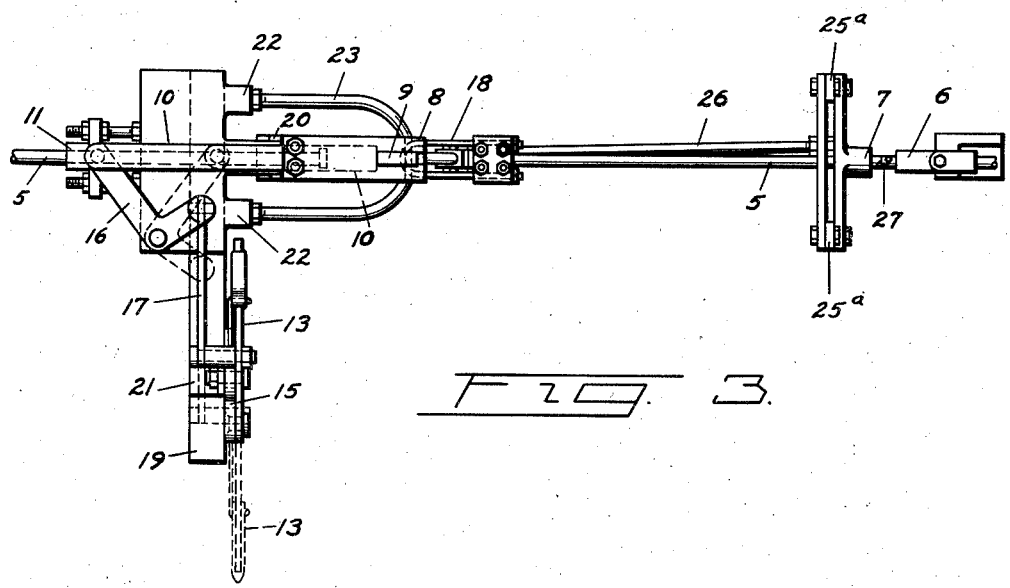
Figure 3 is a plan view of the safety pull-rod connect and disconnect machine.
Figure 5:
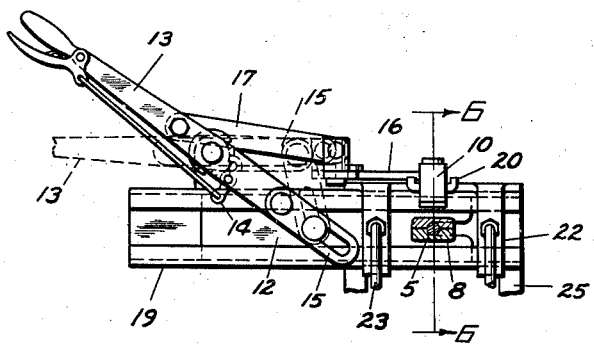
Figure 5 shows a section view of Figure 4 including two separate positions of the manual control lever arrangement not shown in Figure 4.

The manual control lever 13 has three locked positions, with first position as shown in Figure 4 and the remaining two positions shown in Figure 5. By locking manual control lever 13 in the first position, Figure 4, the safety lock 12, Figure 4, being connected to said manual control lever 13 by the reversible angle slotted link 15, Figure 4, is locked in the out position. Since release latch lever 10 is connected through angle booster 16, Figure 3, and link 17, Figure 4, to the manual control lever 13, the lever 10 is also locked in out or release position when lever 13 is in first position.

With the safety lock 12 and release latch lever 10, both in the locked out position, the power pull-rod line 5, with attached hook 18, Figure 2, and the latch holder 8 are free to reciprocate with the movement of the revolving eccentric 4 and the power dispenser 3.

When the manual control lever 13 is placed in the second position as shown in Figure 5 and locked by the manual control lever lock 14, Figure 5, the safety lock 12 is moved into the locked position, Figure 5, while release latch lever 10 is moved forward part way in this second position. This position is obtained while the revolving eccentric 4, Figure 1, is in the up position or nearly so thereby moving the power pull-rod line 5 and latch holder 8 in the up position relative to the throw of the eccentric 4.

Then the revolving eccentric 4, continuing in its circular revolution, allows the power pull-rod line 5 and the latch holder 8 to start a downward movement but before this movement of the circular revolution is completed, the latch holder 8 comes to rest on the safety lock 12, Figure 5, which causes said latch holder 8 and that part of the power pull-rod line 5 attached to latch holder 8 to instantly cease its downward movement. The circular revolution of the revolving eccentric 4 and that part of the power pull-rod line 5 connected to revolving eccentric 4 continues on its downward course thereby releasing hook 18 from the latch 9. As hook 18 continues on its downward course in the slot in the latch holder 8, Figure 6, the manual control lever lock 14, Figure 5, may be released. This permits the manual control lever 13, Figure 5, to be moved into the third position which moves release latch lever 10 forward to engage latch 9 and move it forward to the locked out position, Figure 6. This allows the hook 18 to pass in and out of the latch holder 8, Figure 6, with the movement of the revolving eccentric 4, Figure 1.

To engage the semi-automatic latch 9, with the hook 18, the manual control lever 13 is first moved back into the second position. This will allow latch 9 to drop and engage hook 18 on the upward stroke of the power pull-rod line 5. When the latch holder 8 is pulled free of the safety lock 12, the manual control lever 13 may be moved back into the first position, Figure 4. This will place the safety lock 12 in the out position, and the power pull-rod line 5 will again be free to reciprocate through the safety pull-rod connect and disconnect mechanism.

The safety lock 12, the reversible angle slotted link 15, the link 17, the angle booster 16 and the release latch lever 10 through the operation of the manual control lever 13 and manual control lever lock 14, permits the operation of each pull rod independently of the other. However, the manual control lever 13 cannot be operated until the manual control lever lock 14 is released and the safety lock 12 cannot be moved into the unlocked position as long as the release latch lever 10 is engaged with latch 9 in latch holder 8. This makes for a fool-proof combination in operation.

The front and rear legs or standards, 25a and 25, have adjustable cross section bracing 26 for additional strength and to allow for proper alignment of same with the surface elevation.

The bracket 22 is so situated and connected to the frame 19 that it equalizes and divides the strain or weight when the power pull-rod line 5 attached to latch holder 8 comes to rest on the safety lock 12, Figure 5, so that the aforesaid strain or weight will be equalized and evenly distributed and placed as close as possible to a straight line on the permanent anchorage line 27, Figure 2. The anchor yoke 23, which is connected between the bracket 22 and the anchorage line 27, is flexible, which permits of itself straight alignment between bracket 22 and the anchorage line 27.

We are aware that prior to our invention other mechanism for connecting and disconnecting power pull-rod lines have been made, but none to our knowledge, devised as we have substantially set forth, and thus having described our invention, what we claim is:

1. In a safety pull-rod connect and disconnect machine for a reciprocating power pull-rod line, cross-braced adjustable supporting devices for said line with a permanent self-aligning anchor yoke, a detachable connection in said line comprising a hook, a latch holder having an opening to receive said hook, a pivotally mounted latch in said holder opening for engaging said hook, a means for lifting said latch, a slidable safety catch mounted on said supporting devices having open and closed positions arranged to engage said latch holder to hold the stationary part of said disconnected line while the reciprocating part is unlatched therefrom, and a manually operated means for actuating said latch lifting means and said safety catch, said manually operated means being arranged so that said latch cannot be lifted when the safety catch is open.

2. In a safety pull-rod connect and disconnect machine for a reciprocating power pull-rod line, a supporting device for said line, a detachable connection in said line comprising a hook, a latch holder having an opening to receive said hook, a pivotally mounted gravity latch in said holder for engaging said hook, a means for lifting said gravity latch, a slidable safety catch mounted on said supporting device having open and closed positions arranged to engage and hold the stationary part of said line when the reciprocating part is unlatched therefrom, and a manually operated means for operating said latch lifting means and said safety catch, said manually operated means arranged so that said latch cannot be lifted when the safety catch is open.

3. In a mechanism of the class described, a reciprocating power pull-rod line, a frame means for guiding said line, means for detachably joining said line at said frame means comprising a hook connected at one end to one portion of said line, a latch holder connected at one end to another portion of said line, and a semi-automatic latch in said holder adapted to engage the free end of said hook, and a connect-disconnect device mounted on said frame means comprising a slidable bolt adapted to be moved into engagement with said latch holder to bear the load of the portion of the line attached to said latch holder, manual means for shifting said bolt, and means operatively connected to said manual means for lifting said semi-automatic latch and disengaging said hook.

4. In a mechanism of the class described, a reciprocating power rod, a pull cable, a connecting element detachably connecting the rod and cable comprising a hook connected to said power rod, a latch holder connected to said pull cable having an opening to receive said hook, and a semi-automatic latch pivotally mounted in said holder and adapted to engage the hook when in operative position and when the hook is positioned in the holder opening, a stationary support, means carried by said support to effect connecting and disconnecting of said power rod and cable comprising a safety lock adapted to be moved from inoperative position into engagement with the latch holder to interrupt the stroke of the cable, a manually operable means adapted to move said safety lock, and linkage between said last named means and said semi-automatic latch whereby said latch may be pivoted from operative position by movement of said manually operable means thereby freeing the hook from the latch holder.

5. In a mechanism of the class described, a reciprocating power rod, a pull cable, a connecting element detachably connecting the rod and cable comprising a hook connected to said power rod, a latch holder connected to said pull cable having an opening to receive said hook, and a semi-automatic latch pivotally mounted in said holder and adapted to engage the hook when in operative position and when the hook is positioned in the holder opening, a stationary support, means carried by said support to effect connecting and disconnecting of said power rod and cable comprising a safety lock adapted to be moved from inoperative position into engagement with the latch holder to interrupt the stroke of the cable, manually operable means adapted to move said safety lock, and linkage between said last named means and said semi-automatic latch whereby said latch may be pivoted from operative position by movement of said manually operable means thereby freeing the hook from the latch holder, said latch being designed to block movement of said linkage when said safety lock is in inoperative position.

6. In a mechanism of the class described, a reciprocating power pull rod line, a frame means for guiding said line, means detachably joining said line at said frame means comprising a hook connected at one end to one portion of said line, a latch holder connected to the other portion of said line and having an opening to receive said hook, a pivoted latch in said holder adapted to lock the hook in engagement therewith, and a connect-disconnect device mounted on said frame means comprising a slidable safety bolt adapted to be moved from inoperative position into engagement with said latch holder to interrupt the movement thereof, manual means for shifting said safety bolt, means for lifting said latch to an inoperative position, and linkage operatively connecting said latch lifting means to said manual means whereby movement of said manual means beyond the point necessary to place said safety bolt in engagement with said latch holder will release said hook from said latch.

7. In a mechanism of the class described, a reciprocating power pull rod line, a frame means for guiding said line, means detachably joining said line at said frame means comprising a hook connected at one end to one portion of said line, a latch holder connected to the other portion of said line and having an opening to receive said hook, a pivoted latch in said holder adapted to lock the hook in engagement therewith, and a connect-disconnect device mounted on said frame means comprising a slidable safety bolt adapted to be moved from inoperative position into engagement with said latch holder to interrupt the movement thereof, a lever to be manually actuated for shifting said safety bolt into engagement with said latch holder, a slotted link operatively connecting said lever to said bolt, means for lifting said latch to an inoperative position, and linkage operatively connecting said latch lifting means to said lever, said slotted link being so positioned relative to said lever and said safety bolt that said linkage and latch lifting means can only be actuated by said lever when said safety bolt engages said latch holder.

8. In a mechanism of the class described, a reciprocating power pull rod line, a frame means for guiding said line, means detachably joining said line at said frame means comprising a hook connected at one end to one portion of said line, a latch holder connected to the other portion of said line and having an opening to receive said hook, a pivoted latch in said holder adapted to lock the hook in engagement therewith, and a connect-disconnect device mounted on said frame means comprising a slidable safety bolt adapted to be moved from inoperative position into engagement with said latch holder to interrupt the movement thereof, a lever to be manually actuated for shifting said safety bolt into engagement with said latch holder, a slotted link operatively connecting said lever to said bolt, means for lifting said latch to an inoperative position and linkage operatively connecting said latch lifting means to said lever, said slotted link being adapted to block the movement of said linkage and latch lifting means when said safety bolt is in inoperative position.

9. In a mechanism of the class described, a reciprocating power pull-rod line joined at one portion by connect-disconnect device comprising a hook, a latch holder and semi-automatic latch for engaging said hook, a stationary frame, a sliding safety lock on said frame for engaging said latch holder, and manually operable means adapted to successively slide said safety lock into engagement with said latch holder and to release said latch from said hook.

LAWRENCE JEFFERSON McKINNEY.
CHRISTIAN WINTHER JENSEN.